United States Patent
Frieman

(10) Patent No.: US 6,926,530 B2
(45) Date of Patent: Aug. 9, 2005

(54) GAME APPARATUSES AND METHODS FOR USE IN TEACHING THE ADDITION AND SUBTRACTION OF POSITIVE AND NEGATIVE NUMBERS

(76) Inventor: Shlomo Ruvane Frieman, 139 S. Mansfield Ave., Los Angeles, CA (US) 90036

( * ) Notice: Subject to any disclaimer, the term of this patent is extended or adjusted under 35 U.S.C. 154(b) by 80 days.

(21) Appl. No.: 10/264,875

(22) Filed: Oct. 4, 2002

(65) Prior Publication Data

US 2004/0067473 A1 Apr. 8, 2004

(51) Int. Cl.⁷ .............................. G09B 23/02
(52) U.S. Cl. ................ 434/191; 434/188; 434/208; 434/209
(58) Field of Search ............... 434/190, 195, 434/196, 188, 191, 193, 200, 201, 203, 204, 205, 208, 276, 277, 278, 281, 283; 446/85, 129, 137; 273/236, 273, 288, 289

(56) References Cited

U.S. PATENT DOCUMENTS

| | | | |
|---|---|---|---|
| 651,892 A * | 6/1900 | Schneider .................... 434/208 |
| 1,294,126 A | 2/1919 | Linay | |
| 3,094,792 A | 6/1963 | Morgan et al. | |
| 3,229,388 A | 1/1966 | Smith | |
| 3,410,002 A | 11/1968 | Mulholland et al. | |
| 3,414,986 A | 12/1968 | Stassen | |
| 3,452,454 A | 7/1969 | Easton et al. | |
| 3,935,649 A | 2/1976 | Harte | |
| 4,177,581 A | 12/1979 | Walker | |
| 4,354,842 A * | 10/1982 | Stoddard et al. ............ 434/195 |
| 4,382,794 A * | 5/1983 | Preus ......................... 434/193 |
| 4,518,358 A * | 5/1985 | Mather ....................... 434/195 |
| 4,713,009 A * | 12/1987 | Borenson .................... 434/188 |
| 5,039,603 A * | 8/1991 | Pocius ........................ 434/188 |
| 5,167,505 A * | 12/1992 | Walsh ........................ 434/205 |
| 5,192,077 A * | 3/1993 | Caicedo ...................... 273/155 |
| 5,238,407 A * | 8/1993 | Pollock ....................... 434/195 |
| 5,334,026 A * | 8/1994 | Ylitalo ....................... 434/203 |
| 5,474,455 A | 12/1995 | Yang | |
| 5,529,497 A * | 6/1996 | Bigold ....................... 434/191 |
| 6,089,871 A | 7/2000 | Jaffe | |
| 6,413,099 B2 | 7/2002 | Rainey | |
| 6,513,708 B2 * | 2/2003 | Evans ......................... 235/64 |

* cited by examiner

Primary Examiner—Kurt Fernstrom

(57) ABSTRACT

A game apparatus and a method for assisting in teaching the addition and subtraction of positive and, especially, negative numbers, are based on the Null Theory of Adding and Subtracting Positive and Negative Numbers. The apparatus comprises (a) a plurality of positive units, (b) a plurality of negative units, (c) a demarcated playing zone, and (d) a means for measuring the number of free positive units and free negative units within the demarcated playing zone. Within the demarcated playing zone, free positive units combine with free negative units zone to form null units, with each null unit comprising an equal number of positive units and an equal number of negative units. Each null unit preferably comprises one positive unit and one negative unit.

30 Claims, 8 Drawing Sheets

GAME APPARATUSES AND METHODS FOR USE IN TEACHING THE ADDITION AND SUBTRACTION OF POSITIVE AND NEGATIVE NUMBERS

FIELD OF THE INVENTION

The present invention relates to educational game apparatuses and methods for use in teaching the addition and subtraction of positive and, especially, negative numbers. The game apparatuses and methods of the present invention enable students to see and understand a theory for adding and subtracting positive and negative numbers.

DESCRIPTION OF THE PRIOR ART

A description of the prior art is set forth in U.S. Pat. Nos. 1,294,126, 3,094,792, 3,229,388, 3,410,002, 3,414,986, 3,452,454, 3,935,649, 4,177,681, 5,474,455, 6,089,871, and 6,413,099, which patents are incorporated herein in their entireties by reference.

As evidenced by the above-cited patents, educational game apparatuses and methods exist for teaching mathematical concepts. However, teaching the addition and subtraction of positive and, especially, negative numbers usually entails students learning by rote the rules of adding and subtracting positive and negative numbers without ever understanding the rhyme or reason behind what they are doing. Other students, unfortunately, never learn the rules and, for them, mathematics becomes a dreaded black hole.

SUMMARY OF THE INVENTION

Accordingly, a technique is needed for teaching the addition and subtraction of positive and, especially, negative numbers that clearly explains a cogent theory behind rules.

The apparatuses and methods of the present invention for teaching the addition and subtraction of positive and negative numbers solve the above need. More specifically, the present invention is based on the Null Theory of Adding and Subtracting Positive and Negative Numbers (hereinafter referred to as the "Null Theory"). According to the Null Theory, the natural state of a given environment is the null state. In the null state, the environment is in perfect balance and appears to be devoid of any matter. However, the environment is, in fact, composed of a plurality of null units, with each null unit being, in turn, composed of a positive unit and a negative unit. The environment can be disturbed by introducing (i.e., adding) into it one or more additional positive units or one or more negative units. The environment can also be disturbed by removing (i.e., subtracting) from it one or more positive units or one or more negative units. In the latter case, if there are not enough free positive units available to be removed from the environment, a sufficient number of null units are split to obtain the desired number of positive units to be removed from the environment. When a null unit is split and the positive unit thereof is removed from the environment, a negative unit is left behind in the environment. (Hence, the foregoing explanation of the Null Theory clarifies and visually demonstrates the reason behind the rule that a negative times a positive is a negative.) Likewise, if there are not enough free negative units available to be removed from the environment, a sufficient number of null units are split to obtain the desired number of negative units to be removed from the environment. When a null unit is split and the negative unit thereof is removed from the environment, a positive unit is left behind in the environment. (Accordingly, the foregoing explanation of the Null Theory clarifies and visually demonstrates the reason behind the rule that a negative times a negative is a positive.)

Another aspect of the Null Theory is that only excess positive units or excess negative units remain in the free state within the environment. For example, if there are 5 free positive units in the environment and if 3 negative units are introduced into the environment (as is the case in the mathematical expression 5+(−3)), the 3 negative units will combine with 3 of the free positive units to form 3 null units, leaving only 2 free positive units in the environment.

With the Null Theory in mind, in one embodiment of the present invention, the game apparatus employed to teach the addition and subtraction of positive and negative numbers comprises (a) a plurality of positive units, (b) a plurality of negative units, and (c) a demarcated playing environment or zone. The positive units and the negative units are adapted to reversibly attach to or be associated with one another to form null units, with each null unit comprising at least one positive unit and at least one negative unit and the number of positive units and the number of negative units per null unit being equal. (As used in the specification and claims, the terms "attached to" and "associated with" both mean that the objects in question either can be physically reversibly held together or can be positioned in a manner such that the objects appear to have an affinity for or relationship with one another.) Preferably, each null unit comprises just one positive unit and just one negative unit.

The demarcated playing zone is typically an integral part of a playing surface.

Generally, the game apparatus further comprising a means for measuring the number of units selected from the group consisting positive units, negative units, and combinations thereof, with the measuring means desirably being located on the playing surface and, preferably, within the demarcated playing zone. The measuring means, which can be a scale for weighting the positive and/or negative units, is ideally an axis marked in substantially equal units from 0 to M and in substantially equal units from 0 to N, where M is a positive whole integer, N is a negative whole integer, and substantially each of the positive units is adapted to reversibly attach to or be associated with a unit from 0 to M on the axis on the playing surface; and substantially each of the negative units is adapted to reversibly attach to or be associated with a unit from 0 to N on the axis on the playing surface. While M can be virtually any positive integer, M is typically a whole positive integer from 5 to 50, more typically from about 10 to 25, and most typically from 10 to 20. Similarly, while N can be virtually any negative integer, N is commonly a whole negative number from −5 to −50, more commonly from about −10 to −25, and most commonly from −10 to −20. Usually, M equals the absolute value of N.

It is also preferred that the game apparatus further comprising a plurality of means for reversibly holding a plurality of the null units located within the demarcated playing zone.

The game apparatus preferably also comprises an additional means for reversibly holding at least one positive unit and an additional means for reversibly holding at least one negative unit. More preferably, the game apparatus further comprises an additional means for reversibly holding a plurality of positive units and an additional means for reversibly holding a plurality of negative units. Most preferably, the additional positive unit holding means and the additional negative unit holding means are located on the playing surface outside the demarcated playing zone.

The playing surface of the game apparatus can be a screen of an electrical unit (such as a computer screen, a television screen, etc), a surface of a game board, a surface of a blackboard or other writing surface, a Velcro® surface, a static electricity charged surface, or the surface of any other apparatus or device capable of displaying the demarcated playing zone, the null units, the positive units, the negative units, and the means for showing the number of free positive units and/or free negative units within the demarcated playing zone.

The game apparatus of the present invention is employed in conjunction with a method that utilizes the principles of the Null Theory. In particular, the method of the present invention comprises the following steps:

Step A

Play begins in a null state where a demarcated playing zone comprises a plurality of null units, with each null unit comprising at least one positive unit reversibly attached to at least one negative unit, the number of positive and negative units per null unit being equal.

Step B

Take the first mathematical expression in a problem involving X mathematical expressions, with X being a whole positive number, and perform the mathematical operation indicated by the first mathematical expression. In the problem, the first mathematical expression is selected from the group of positive numbers and negative numbers and each of the remaining X−1 mathematical expressions is selected from the group consisting of the addition of a positive number, the subtraction of a positive number, the addition of a negative number, the subtraction of a negative number, and combinations thereof. In performing the mathematical operation indicated by the first mathematical expression, (i) if the first mathematical expression is a positive number $Y_1$, then the mathematical operation of step (B) comprises moving $Y_1$ free positive units from outside the demarcated playing zone to within the demarcated playing zone and (ii) if the first mathematical expression is a negative number $Z_1$, then the mathematical operation of step (B) comprises moving the absolute value of $Z_1$ free negative units from outside the demarcated playing zone to within the demarcated playing zone. (Alternatively, the mathematical operation indicated by the first mathematical expression can be performed as follows: (i) if the first mathematical expression is a positive number $Y_1$, then the mathematical operation of step (B) can be accomplished by breaking apart $Y_1$ null units into $Y_1$ free positive units and into $Y_1$ free negative units and moving the $Y_1$ free negative units from within the demarcated playing zone to outside the demarcated playing zone and (ii) if the first mathematical expression is a negative number $Z_1$, then the mathematical operation of step (B) can be accomplished by breaking apart the absolute value of $Z_1$ null units into the absolute value of $Z_1$ free positive units and into the absolute value of $Z_1$ free negative units and moving the absolute value of $Z_1$ free positive units from within the demarcated playing zone to outside the demarcated playing zone.)

Step C

Take the second mathematical expression in the problem and perform the mathematical operation indicated by the second mathematical expression as follows:

1. If the second mathematical expression represents the addition of a positive number $Y_2$, then step (C) comprises moving $Y_2$ free positive units from outside the demarcated playing zone to within the demarcated playing zone and, if there are any free negative units within the demarcated playing zone, then step (C) further comprises combining up to $Y_2$ free negative units with up to the $Y_2$ free positive units that were moved into the demarcated playing zone.

2. If the second mathematical expression represents the subtraction of a positive number $Y_2$, then step (C) comprises moving $Y_2$ free positive units from within the demarcated playing zone to outside the demarcated playing zone and, if there are not $Y_2$ free positive units within the demarcated play zone to move to outside the demarcated zone, then step (C) further comprises breaking apart enough null units to obtain up to the required $Y_2$ free positive units and moving the $Y_2$ free positive to outside the demarcated playing zone.

3. If the second mathematical expression represents the addition of a negative number $Z_2$, then step (C) comprises moving the absolute value of $Z_2$ free negative units from outside the demarcated playing zone to within the demarcated playing zone and, if there are any free positive units within the demarcated playing zone, then step (C) further comprises combining up to the absolute value of $Z_2$ free positive units with up to the absolute value of $Z_2$ free negative units that were moved into the demarcated playing zone.

4. If the second mathematical expression represents the subtraction of a negative number $Z_2$, then step (C) comprises moving the absolute value of $Z_2$ free negative units from within the demarcated playing zone to outside the demarcated playing zone and, if there are not enough absolute value of $Z_2$ free negative units within the demarcated play zone to move to outside the demarcated playing zone, then step (C) further comprises breaking apart enough null units to obtain up to the required absolute value of $Z_2$ free negative units and moving the absolute value of $Z_2$ free negative to outside the demarcated playing zone.

Step D

Repeat step (C) for each of the remaining X−2 mathematical expression in the problem.

As noted with respect to the game apparatus, in the method of the present invention, each null unit preferably comprises one positive unit reversibly attached to or associated with one negative unit.

It is also preferred that the method further comprise the step of measuring the number of the free positive units and the number of the free negative units within the demarcated playing zone. In one preferred version of the method of the present invention, the measurement is performed by the step of placing the free positive units that are within the demarcated playing zone along the positive portion of an axis marked with substantially equal spaces from 0 to M and the step of placing the free negative units that are within the demarcated playing zone along the negative portion of an axis marked with substantially equal spaces from 0 to N, where M and N are as previously defined above. While the positive portion of the axis preferably forms a continuum with the negative portion of the axis, the present invention includes the embodiment where there is a separate positive axis having substantially equal spaces from 0 to M and a separate negative axis having substantially equal spaces from 0 to N, where M and N are as previously defined.

While the foregoing apparatus and method can be used to teach young children who are just learning to add and subtract only positive numbers, when teaching the addition and subtraction of only positive numbers, it is sufficient to use a simpler game apparatus such as one comprising (a) at least one means for measuring unit increments; (b) a plurality of means for indicating a single unit; and (c) a means holding the plurality of single unit indicating means in slidable relationship to the measuring means. For instance, the plurality of single unit indicating means can comprise a plurality of beads, the holding means can comprise a dowel, with the beads being slide ably mounted on the dowel, and the game apparatus can comprises two measuring means (such as two rulers), with each measuring means being position so that the game apparatus can be played with equal facility by both right and left handed players.

For a fuller understanding of the nature and advantages of the mathematical game apparatuses and methods of the present invention, reference should be made to the ensuing detailed description taken in conjunction with the accompanying drawings.

BRIEF DESCRIPTION OF THE DRAWINGS

Exemplary game apparatuses of the present invention are shown in the drawings where.

It should be noted that the same numbers in the figures represent the same element of the game apparatuses of the present invention.

DETAILED DESCRIPTION OF THE INVENTION

Figure 1:
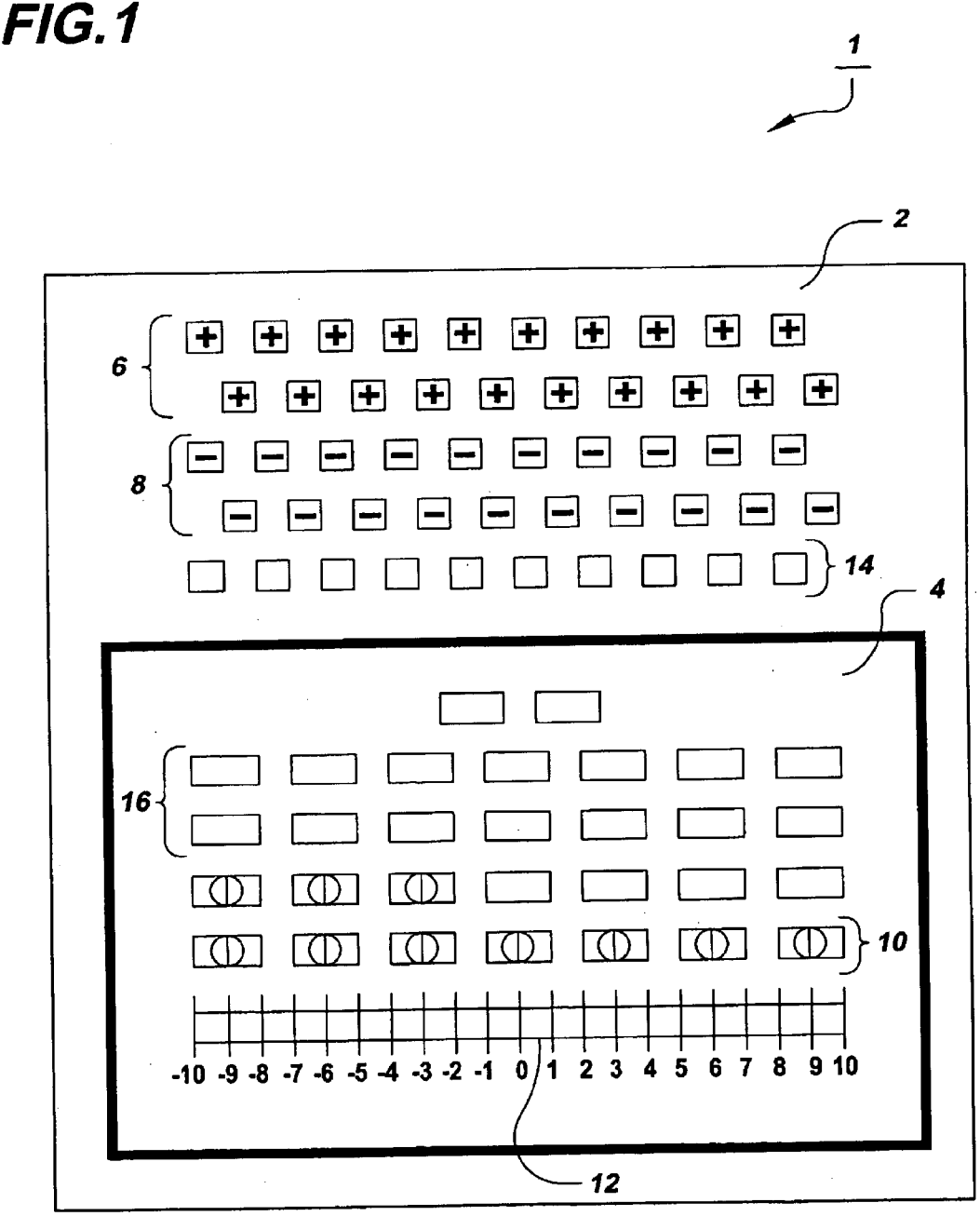
FIG. 1 is a top view of a playing surface employed in the method of the present invention.

FIG. 1 shows an embodiment of the present invention in which the game apparatus 1 comprises a playing surface 2, a demarcated playing environment or zone 4 within the playing surface 2, a plurality of free positive units 6 removably attached to the playing surface 2 outside the demarcated playing zone 4, a plurality of free negative units 8 removably attached to the playing surface 2 outside the demarcated playing zone 4, a plurality of null units 10 removably attached to the playing surface 2 within the demarcated playing zone, and an axis 12 numbered from −10 to 10.

The playing surface 2 can be a game board, a computer screen, a television screen, a liquid crystal display screen, or any other means for displaying the demarcated playing zone 4, the free positive units 6, the free negative units 8, the null units 10, and the axis 12.

The area of the demarcated playing zone 4 can comprise a portion of the area of the playing surface 2 as shown in FIG. 1 or can comprise the entire area of the playing surface 2. When the area of demarcated playing zone 4 constitutes the entire area of the playing surface 2, the free positive units 6 and the free negative units 8 either can be held in essentially any container (such as a cup, a bowl, a bag, a pocket, a groove, etc.) or can be loose.

In the version of the invention shown in FIG. 1, the free positive units 6 and the free negative units 8 are removably attached to the playing surface 2 by snuggly fitting into depressions 14 in the playing surface 2. Other means for removably attaching the positive units 6 and the negative units 8 to the playing surface 2 include, but are not limited to, Velcro, snap fittings (such as used on clothing or on Lego® building blocks), screw fittings, gravity, etc. Of course, when the playing surface 2 is a computer screen or other essentially two-dimensional means for displaying the playing surface 2, the positive units 6 and negative units 8 are merely displayed on or merely displayed as being associated with the essentially two-dimensional means for displaying the playing surface 2.

Similarly, in the version of the invention shown in FIG. 1, the null units 10 are also removably attached to the demarcated playing zone 4 by snuggly fitting into depressions 16 in the demarcated playing zone 4. Likewise, other means for removably attaching the null units 10 to the demarcated playing zone 4 also include, but are not limited to, Velcro, snap fittings (such as used on clothing or on Lego® building blocks), screw fittings, gravity, etc. In addition, when the playing surface 2 is a computer screen or other essentially two-dimensional means for displaying the playing surface 2, the null units 10 are merely displayed on or merely displayed as being associated with the essentially two-dimensional means for displaying the playing surface 2.

In the embodiment of the invention shown in FIG. 1, the amount of free positive units 6 and free negative units 8 in the demarcated playing zone 4 are measured along the axis 12. As shown in FIG. 1, the axis 12 is numbered from 10 to −10. However, the axis could just as well be numbered from M to N, where M is a positive integer and N is a negative integer. Preferably, M is a positive integer from 5 to 50, more preferably from 10 to 25, and most preferably from 10 to 20. Similarly, N is a negative integer from −5 to −50, more preferably from −10 to −25, and most preferably from −10 to −20. Usually, M is equal to the absolute value of N. Furthermore, other means such as a weighting scale, a unit counter, etc. can be used to measure the number of free positive units 6 and free negative units 8 within the demarcated playing zone 4. Also, the measuring means can be located inside or outside the demarcated playing zone 4 and, in fact, on or off the playing surface 2. When the playing surface 2 is the display media used in conjunction with a computerized version of the method of the present invention, all that need be shown on the display media is the number of free positive units 6 and/or the number of free negative units 8 within the demarcated playing zone 4.

Figure 2:
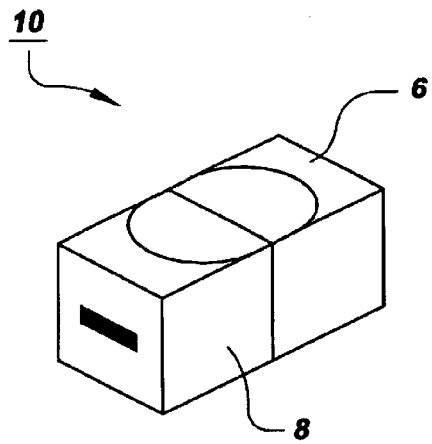
FIG. 2 is an isometric view of a null unit employed in the method of the present invention showing a negative sign on one of the two constituent components of the null unit.
Figure 3:
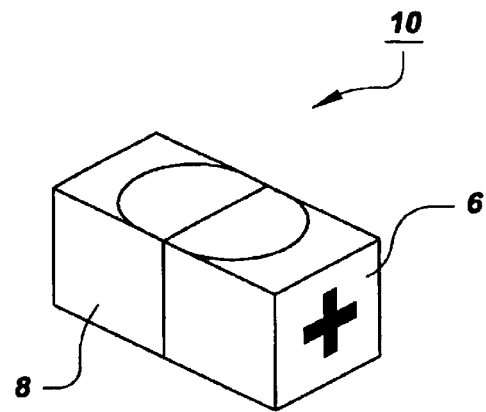
FIG. 3 is another isometric view of a null unit employed in the method of the present invention showing a positive sign on one of the two constituent components of the null unit.

As shown in more detail in FIGS. 2 and 3, the null units 10 consist of a positive unit 6 removably attached to a negative unit 8. While the null unit can consist of a plurality of positive units 6 and a plurality of negative units 8 removably attached together, preferably the number of positive units 6 and the number of negative units 8 per null unit 10 are equal and, more preferably, the null unit consists of a single positive unit 6 removably attached to a single negative unit 8.

Figure 4:
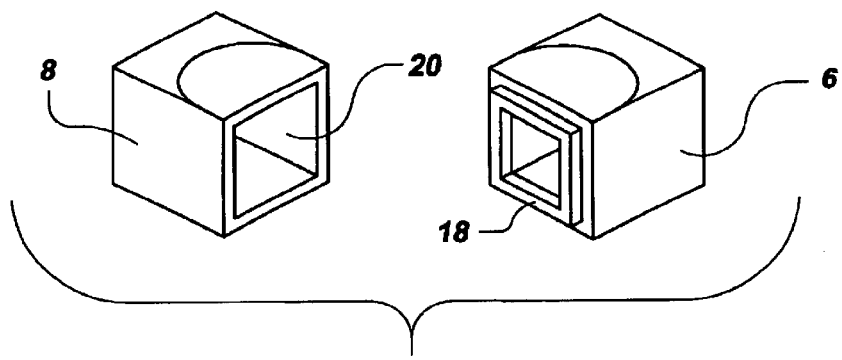
FIG. 4 is an isomeric view of a null unit separated into its two constituent halves, namely, the positive component and the negative component.

In the embodiment of the invention shown in FIG. 4, the positive unit 6 has a neck 18 that is adapted to snuggly fit into an opening 20 in the negative unit 8 to form the null unit 10. Other means for removably attaching the positive units 6 to the negative units 8 to form the null units 10 include, but are not limited to, Velcro, snap fittings (such as used on clothing or on Lego® building blocks), screw fittings, etc. In addition, when the playing surface 2 is a computer screen or other essentially two-dimensional means for displaying the playing surface 2, the positive unit 6 and negative unit 8 portions of each null unit 10 are merely displayed in close proximity (i.e., as being associated with one another) on the essentially two-dimensional means for displaying the playing surface 2.

The game apparatus of the present invention is employed in conjunction with a method that comprises the following steps:

Step A

Play begins in a null state where a demarcated playing zone 4 comprises a plurality of null units 10, with each null unit 10 comprising at least one positive unit 6 reversibly attached to or associated with at least one negative unit 6, the number of positive units 6 and negative units 8 per null unit 10 being equal.

Step B

Take the first mathematical expression in a problem involving X mathematical expressions, with X being a whole positive number, and perform the mathematical operation indicated by the first mathematical expression. In the problem, the first mathematical expression is selected from the group of positive numbers and negative numbers and each of the remaining X–1 mathematical expressions is selected from the group consisting of the addition of a positive number, the subtraction of a positive number, the addition of a negative number, the subtraction of a negative number, and combinations thereof. In performing the mathematical operation indicated by the first mathematical expression, (i) if the first mathematical expression is a positive number $Y_1$, then the mathematical operation of step (B) comprises moving $Y_1$ free positive units 6 from outside the demarcated playing zone 4 to within the demarcated playing zone 4 and (ii) if the first mathematical expression is a negative number $Z_1$, then the mathematical operation of step (B) comprises moving the absolute value of $Z_1$ free negative units 8 from outside the demarcated playing zone 4 to within the demarcated playing zone 4. (Alternatively, the mathematical operation indicated by the first mathematical expression can be performed as follows: (i) if the first mathematical expression is a positive number $Y_1$, then the mathematical operation of step (B) can be accomplished by breaking apart $Y_1$ null units 10 into $Y_1$ free positive units 6 and into $Y_1$ free negative units 8 and moving the $Y_1$ free negative units 8 from within the demarcated playing zone 4 to outside the demarcated playing zone 4 and (ii) if the first mathematical expression is a negative number $Z_1$, then the mathematical operation of step (B) can be accomplished by breaking apart the absolute value of $Z_1$ null units 10 into the absolute value of $Z_1$ free positive units 6 and into the absolute value of $Z_1$ free negative units 8 and moving the absolute value of $Z_1$ free positive units 6 from within the demarcated playing zone 4 to outside the demarcated playing zone 4.)

Step C

Take the second mathematical expression in the problem and perform the mathematical operation indicated by the second mathematical expression as follows 1. If the second mathematical expression represents the addition of a positive number $Y_2$, then step (C) comprises moving $Y_2$ free positive units 6 from outside the demarcated playing zone 4 to within the demarcated playing zone 4 and, if there are any free negative units 8 within the demarcated playing zone 4, then step (C) further comprises combining up to $Y_2$ free negative units 8 with up to the $Y_2$ free positive units 6 that were moved into the demarcated playing zone.

2. If the second mathematical expression represents the subtraction of a positive number $Y_2$, then step (C) comprises moving $Y_2$ free positive units 6 from within the demarcated playing zone to outside the demarcated playing zone 4 and, if there are not $Y_2$ free positive units 6 within the demarcated play zone 4 to move to outside the demarcated zone 4, then step (C) further comprises breaking apart enough null units 10 to obtain up to the required $Y_2$ free positive units 6 and moving the $Y_2$ free positive units 6 to outside the demarcated playing zone 4.

3. If the second mathematical expression represents the addition of a negative number $Z_2$, then step (C) comprises moving the absolute value of $Z_2$ free negative units 8 from outside the demarcated playing zone 4 to within the demarcated playing zone 4 and, if there are any free positive units 6 within the demarcated playing zone 4, then step (C) further comprises combining up to the absolute value of $Z_2$ free positive units 6 with up to the absolute value of $Z_2$ free negative units 8 that were moved into the demarcated playing zone 4.

4. If the second mathematical expression represents the subtraction of a negative number $Z_2$, then step (C) comprises moving the absolute value of $Z_2$ free negative units 8 from within the demarcated playing zone 4 to outside the demarcated playing zone 4 and, if there are not enough absolute value of $Z_2$ free negative units 8 within the demarcated playing zone 4 to move to outside the demarcated playing zone 4, then step (C) further comprises breaking apart enough null units 10 to obtain up to the required absolute value of $Z_2$ free negative units 8 and moving the absolute value of $Z_2$ free negative units to outside the demarcated playing zone 4.

Step D

Repeat step (C) for each of the remaining X–2 mathematical expression in the problem.

The method of the present invention is further illustrated in the following Example 1, which is intended to demonstrate, and not limit, the present invention:

EXAMPLE 1

Solve the Equation for x:10+(−20)−(−15)−5+3=x

Initially, the playing surface 2 is in the null state as shown in FIG. 1. In the null state, there are no free positive units 6 or free negative units 8 in the demarcated playing zone 4.

The first step in solving the above equation is to write the equation in full as follows:

+10+(−20)−(−15)−(+5)+(+3)=x

In discussing the solution to foregoing equation, each element of the equation shall be identified as follows:

A $S_1$ B $S_2$ C $S_3$ D $S_4$ E +10+(−20)−(−15)−(+5)+(+3)=x

Figure 5:
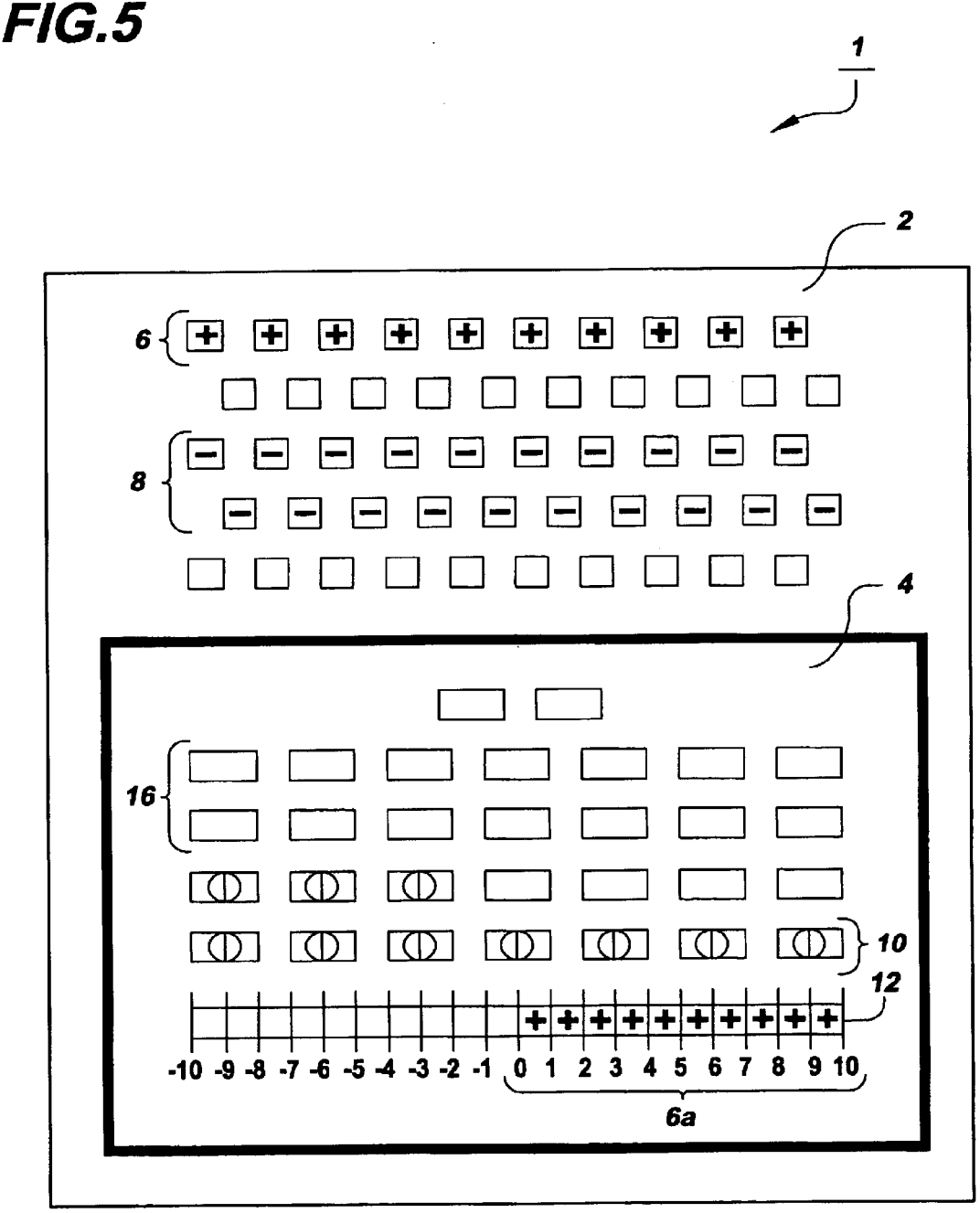
FIG. 5 is a top view of a playing surface employed in the method of the present invention modified in accordance with the first mathematical expression of the mathematical problem of Example 1.

With respect to element A, element A is the initial disturbed state of the demarcated playing zone 4. As shown in FIG. 5, the initial disturbed state of the demarcated playing zone 4 is achieved by moving 10 free positive units 6a into the demarcated playing zone 4 from the playing surface 2 outside the demarcated playing zone 4. The 10 free positive units 6a moved into the demarcated playing zone 4 are measured by placing them in the first 10 positive spaces along the axis 12.

Figure 6:
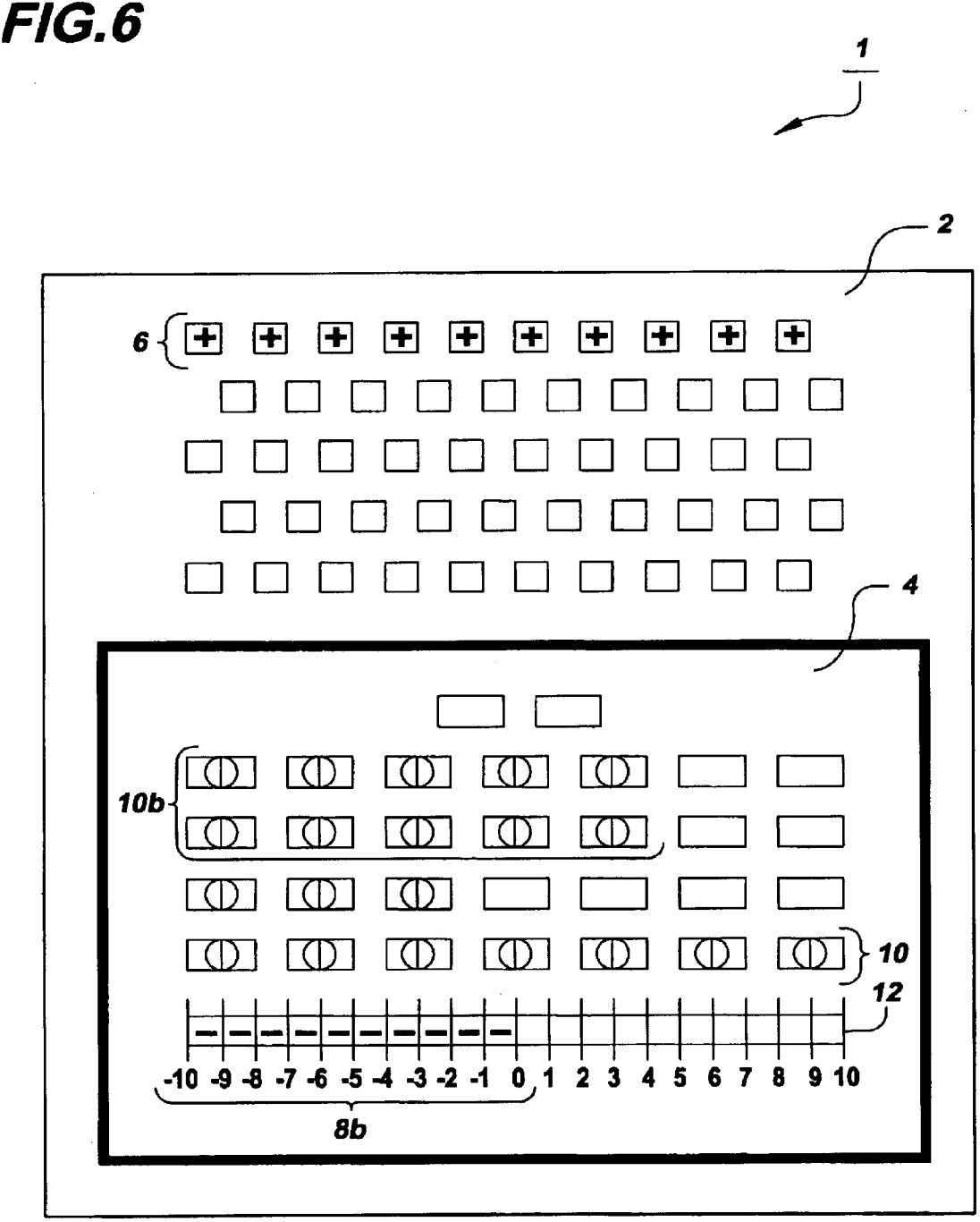
FIG. 6 is a top view of a playing surface employed in the method of the present invention modified in accordance with the second mathematical expression of the mathematical problem of Example 1.

Regarding the first mathematical operator $S_1$, $S_1$ is "+", i.e., a positive sign, which denotes that element B is to be transported into (i.e., added to) the demarcated playing zone 4. Element B is −20 (i.e., 20 negative units 8). As shown in FIG. 6, 10 of the 20 negative units 8 that are moved into the demarcated playing zone combine with the 10 free positive units 6a (see FIG. 5) already in the demarcated playing zone 4 to form 10 null units 10b. The remaining 10 free negative units 8b moved into the demarcated playing zone 4 are measured by placing them in the first 10 negative spaces along the axis 12.

Figure 7:
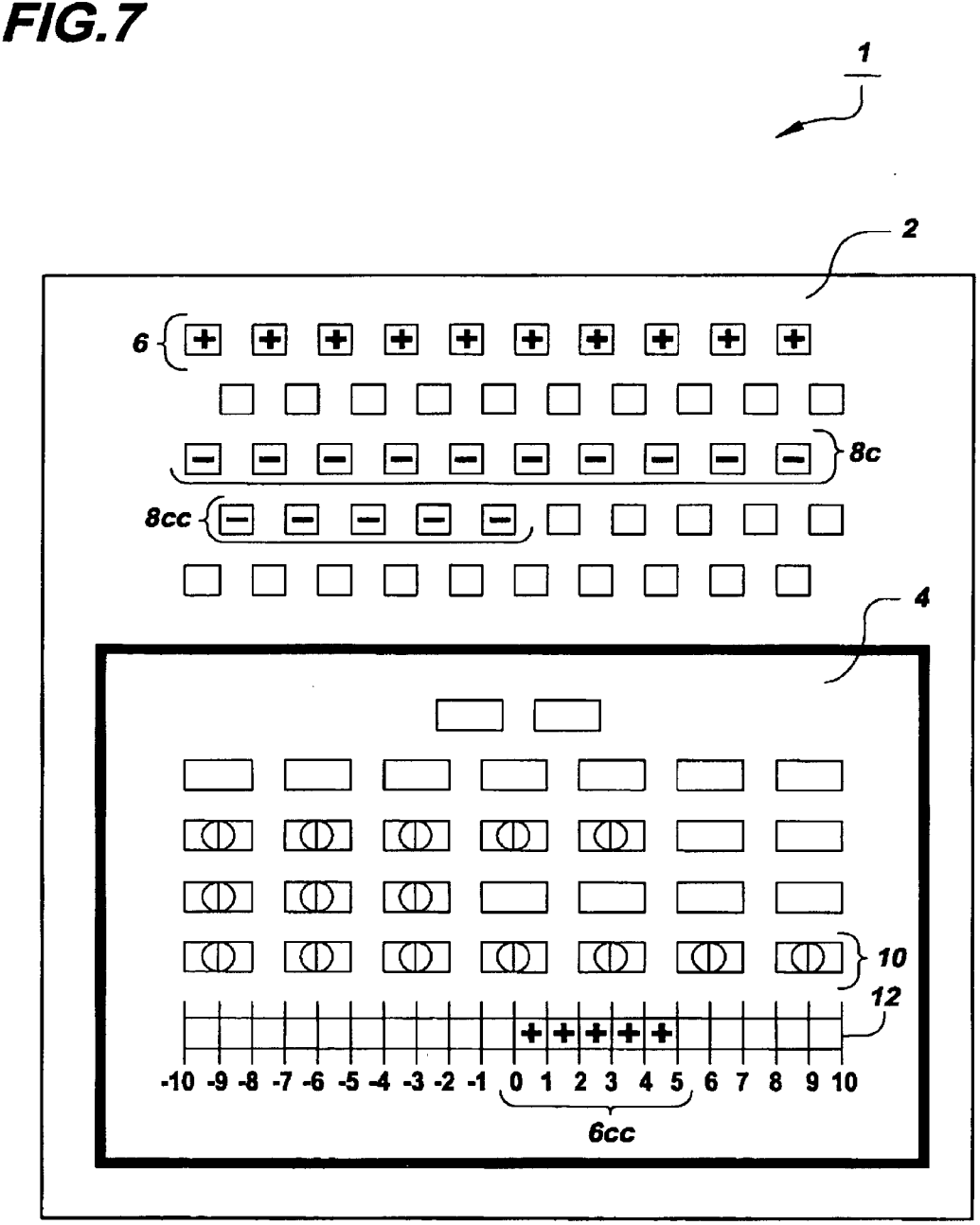
FIG. 7 is a top view of a playing surface employed in the method of the present invention modified in accordance with the third mathematical expression of the mathematical problem of Example 1.

As to the second mathematical operator $S_2$, $S_2$ is "−", i.e., a negative sign, which denotes that element C is to be transported out of (i.e., subtracted from) the demarcated playing zone 4. Element C is −15 (i.e., 15 negative units 8). As shown in FIG. 7, 10 of the 15 negative units 8c that are to be moved out of the demarcated playing zone 4 are present in demarcated playing zone 4 as free negative units 8b of FIG. 6. The remaining 5 negative units 8cc to be transported out of the demarcated playing zone 4 are obtained by taking 5 null units 10 from within the demarcated playing zone 4, breaking these 5 null units 10 into their component parts, namely, 5 free positive units 6cc and 5 free negative units 8cc, moving the thus obtained 5 free negative units 8cc from the demarcated playing zone 4, and placing the remaining 5 free positive units 6cc in the first 5 positive spaces along the axis 12.

Figure 8:
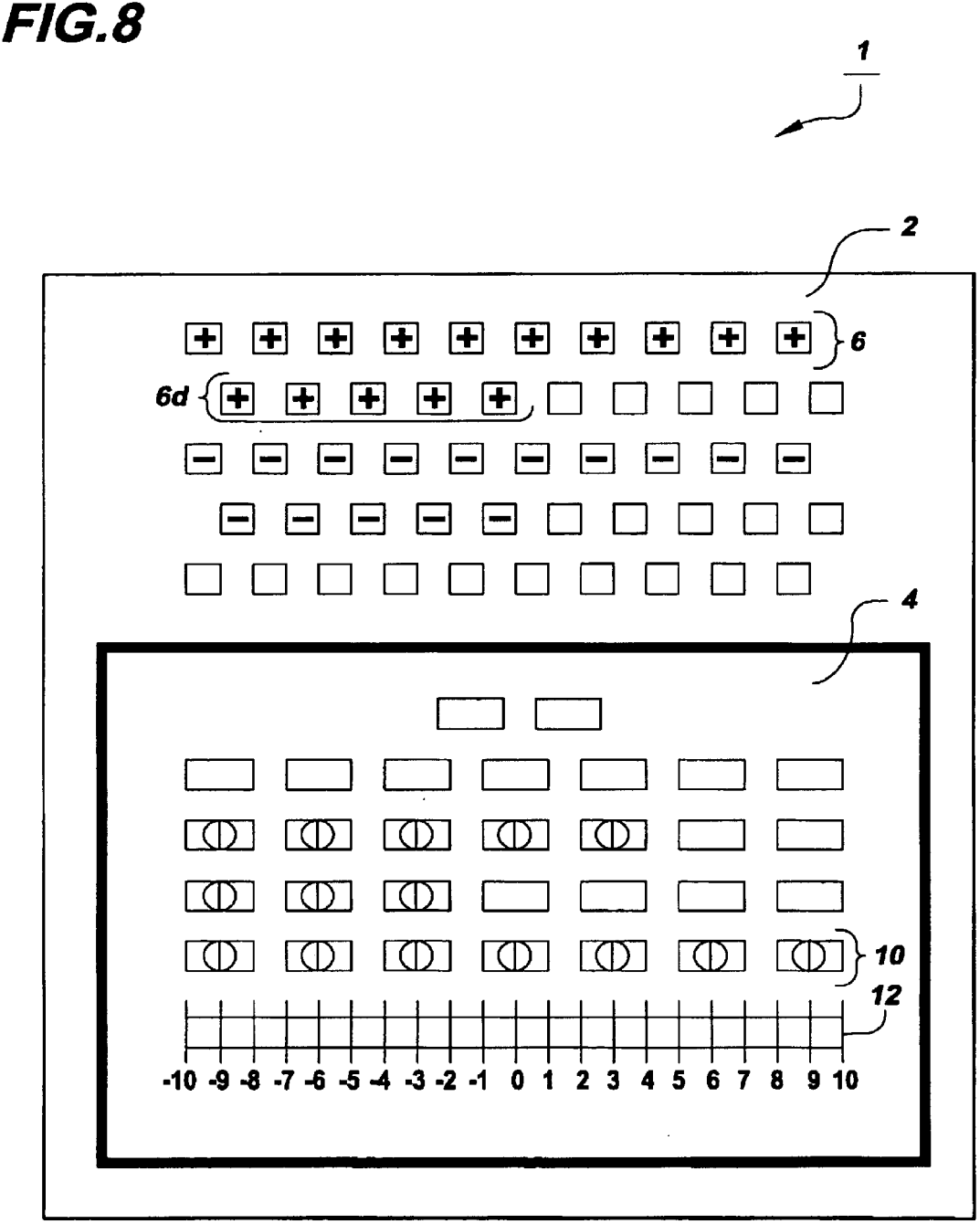
FIG. 8 is a top view of a playing surface employed in the method of the present invention modified in accordance with the fourth mathematical expression of the mathematical problem of Example 1.

With respect to the third mathematical operator $S_3$, $S_3$ is "−" i.e., a negative sign, which denotes that element D is to be transported out of (i.e., subtracted from) the demarcated playing zone 4. Element D is +5 (i.e., 5 positive units 6). As shown in FIG. 8, all of the 5 positive units 6d that were moved out of the demarcated playing zone 4 were already present in the demarcated playing zone 4 as free positive units 6cc shown in FIG. 7.

Figure 9:
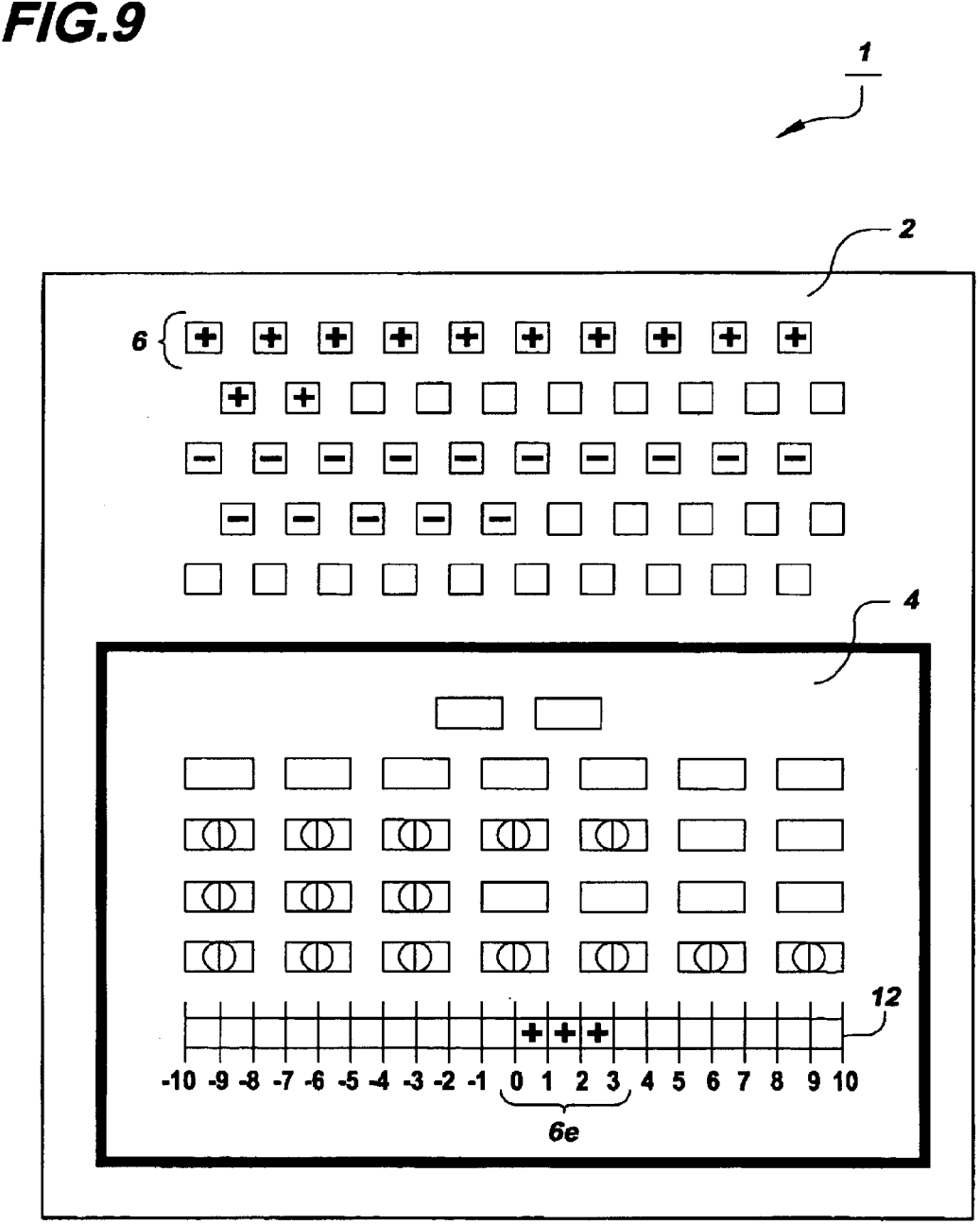
FIG. 9 is a top view of a playing surface employed in the method of the present invention modified in accordance with the fifth mathematical expression of the mathematical problem of Example 1.

Regarding the fourth mathematical operator $S_4$, $S_4$ is "+", i.e., a positive sign, which denotes that element E is to be transported into (i.e., added to) the demarcated playing zone 4. Element E is +3 (i.e., 3 positive units 6). As shown in FIG. 9, since there are no free negative units 8 in the demarcated playing zone 4, the 3 free positive units 6e moved into the demarcated playing zone 4 are measured by placing them in the first 3 positive spaces along the axis 12.

Accordingly, x equals 3.

Figure 10:
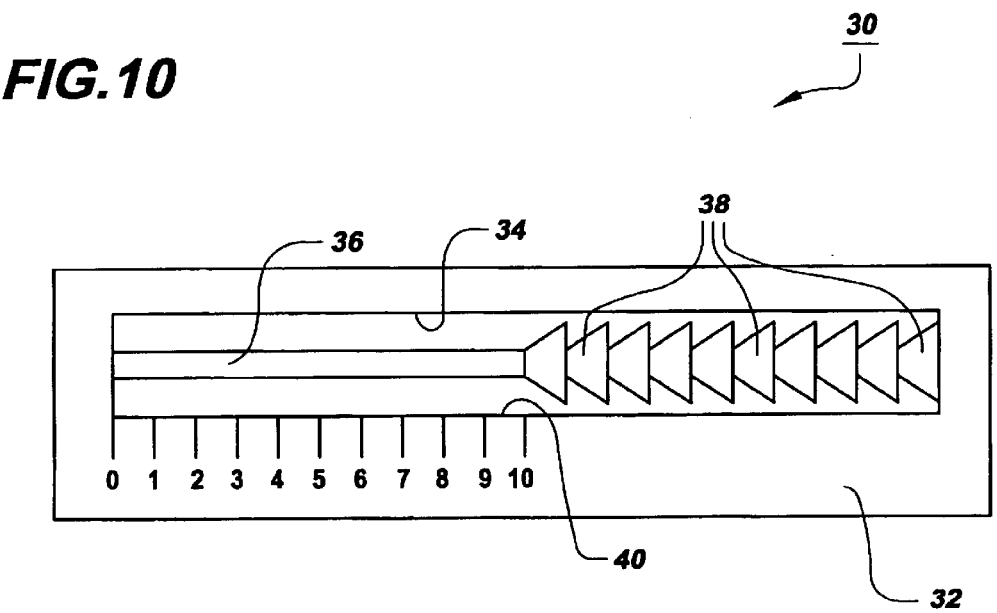
FIG. 10 is a perspective view of the front side of an apparatus within the cope of the present invention for teaching the addition and subtraction of just positive whole numbers.

While the preferred embodiments of the invention have been set forth above in detail, some modifications can be made to the preferred version without departing from the spirit of the present invention. For example, while the above described game apparatus and method can be employed to teach students to add and subtract just positive numbers, a simpler device, such as the one shown in FIGS. 10 and 11 can be also be used. As shown in FIG. 10, the apparatus 30 comprises a body 32 having an opening 34 therein. In the opening 34 is mounted a dowel 36 and on the dowel are axially moveable beads 38. The number of axially movable beads 38 is generally from 5 to 25 and preferably from 10 to 20. On at least one side of the opening is a scale 40 (such as a ruler or other means for measuring length) for measuring the number of beads 38. The beads 38 can be moved to the left when they are being added and can be moved to the right when they are being subtracted.

Figure 11:
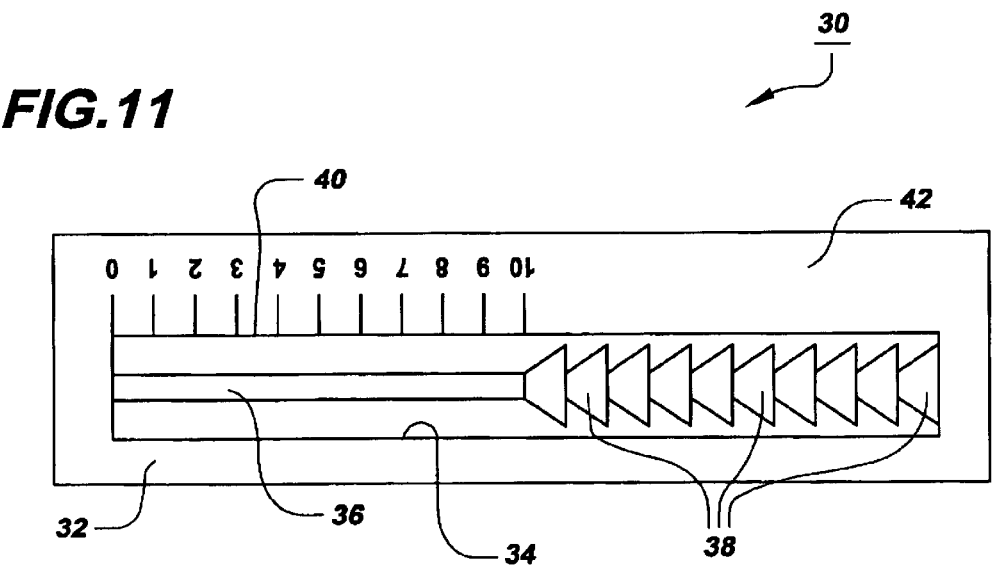
FIG. 11 is a perspective view of the backside of an apparatus within the scope of the present invention for teaching the addition and subtraction of just positive whole numbers.

The reverse side 42 of the apparatus 30 is shown in FIG. 11. In this view of this embodiment of the invention, all the elements mentioned in the preceding paragraph are also present. Accordingly, the apparatus 30 shown in of FIGS. 10 and 11 can be used with equal facility by left- and right-handed students.

Accordingly, the foregoing alternative embodiments are included within the scope of the present invention.

The apparatuses of the present invention can be made by techniques well know to those skilled in the art (e.g., injection molding, forged or cast metal, carpentry, etc.). In addition, software programs can be written by those skilled in the art for executing the methods of the present invention and the computerized versions of the invention can be played on a monitor of any suitably programmable electrical apparatus (such as a television screen, computer screen, liquid crystal display, etc.).

What is claimed is:

1. A game apparatus for assisting in teaching the addition and subtraction of positive and negative numbers, the game apparatus comprising:
   (a) a plurality of positive units, with each positive unit bearing an indicia denoting a positive unit;
   (b) a plurality of negative units, with each negative unit bearing an indicia denoting a negative unit; and
   (c) a playing surface comprising a demarcated playing zone,
where
   the positive units and the negative units are adapted to reversibly be associated with one another to form null units, with each null unit comprising at least one positive unit and at least one negative unit.

2. A game apparatus for assisting in teaching the addition and subtraction of positive and negative numbers, the game apparatus comprising:
   (a) a plurality of positive units, with each positive unit bearing an indicia denoting a positive unit;
   (b) a plurality of negative units, with each negative unit bearing an indicia denoting a negative unit;
   (c) a playing surface comprising a demarcated playing zone; and
   (d) a means for measuring the number of units selected from the group consisting positive units, negative units, and combinations thereof,
where
   the positive units and the negative units are adapted to reversibly be associated with one another to form null units, with each null unit comprising at least one positive unit and at least one negative unit.

3. The game apparatus of claim 2 where the measuring means is located within the demarcated playing zone.

4. The game apparatus of claim 2 where the measuring means comprises an axis, where the axis is located within the demarcated playing zone and marked in substantially equal units from N to M, where
- M is a positive whole integer; and
- N is a negative whole integer;
- substantially each of the positive units is adapted to reversibly attach to a unit from 0 to M on the axis on the playing surface; and
- substantially each of the negative units is adapted to reversibly attach to a unit from 0 to N on the axis on the playing surface.

5. The game apparatus of claim 2 where the measuring means comprises an axis, where the axis is located within the demarcated playing zone and marked in substantially equal units from 0 to M and in substantially equal units from 0 to N,
where
- M is a positive whole integer; and
- N is a negative whole integer.

6. A game apparatus for assisting in teaching the addition and subtraction of positive and negative numbers, the game apparatus comprising:
(a) a plurality of positive units, with each positive unit bearing a positive sign;
(b) a plurality of negative units, with each negative unit bearing a negative sign;
(c) a playing surface comprising a demarcated playing zone; and
(d) a means for measuring the number of units selected from the group consisting of positive units, negative units, and combinations thereof,
where
the positive units and the negative units are adapted to reversibly be associated with one another to form null units, with each null unit comprising at least one positive unit and at least one negative unit.

7. A game apparatus for assisting in teaching the addition and subtraction of positive and negative numbers, the game apparatus comprises:
(a) a plurality of positive units, with each positive unit bearing an indicia denoting a positive unit;
(b) a plurality of negative units, with each negative unit bearing an indicia denoting a negative unit;
(c) a playing surface comprising a demarcated playing zone; and
d) a means for measuring the number of units selected from the group consisting of positive units, negative units, and combinations thereof,
where
the positive and negative units are adopted to reversibly be associated with one another to form null units; and
each of the null units consists essentially of one positive unit and one negative unit.

8. A game apparatus for assisting in teaching the addition and subtraction of positive and negative numbers, the game apparatus comprising:
(a) a plurality of positive units, with each positive unit bearing a positive sign;
(b) a plurality of negative units, with each negative unit bearing a negative sign;
(c) a playing surface comprising a demarcated playing zone; and
(d) a means for measuring the number of units selected from the group consisting of positive units, negative units, and combinations thereof,
where
the positive and negative units are adopted to reversibly be associated with one another to form null units; and
each of the null units consists essentially of one positive unit and one negative unit.

9. The game apparatus of claim 8 where the area of the playing surface and the area of the demarcated playing zone are substantially equal.

10. The game apparatus of claim 8 further comprising a means for reversibly holding a plurality of the null units, where the means for reversibly holding the plurality of the null units is located within the demarcated playing zone.

11. The game apparatus of claim 8 where the playing surface comprises a screen of an electrical unit.

12. The game apparatus of claim 8 where the playing surface comprises a surface of a game board.

13. The game apparatus of claim 8 where the demarcated playing zone is an integral part of the playing surface.

14. The game apparatus of claim 8 where the positive units, the negative units, and the null units are removably attached to the playing surface.

15. The game apparatus of claim 8 where the positive units, the negative units, and the null units are removably attached to the playing surface by gravity.

16. The game apparatus of claim 11 where the playing surface comprises a computer screen.

17. The game apparatus of claim 11 where the playing surface comprises a television screen.

18. The game apparatus of claim 8 the measuring means is located within the demarcated playing zone.

19. The game apparatus of claim 8 where the measuring means comprises an axis, where the axis is located within the demarcated playing zone and marked in substantially equal units from 0 to M and in substantially equal units from 0 to N,
where
- M is a positive whole integer; and
- N is a negative whole integer.

20. The game apparatus of claim 8 where the measuring means comprises an axis, where the axis is located within the demarcated playing zone and marked in substantially equal units from N to M,
where
- M is a positive whole integer;
- N is a negative whole integer;
- substantially each of the positive units is adapted to reversibly attach to a unit from 0 to M on the axis on the playing surface; and
- substantially each of the negative units is adapted to reversibly attach to a unit from 0 to N on the axis on the playing surface.

21. The game apparatus of claim 8 further comprises a means for reversibly holding a plurality of the null units, where
the means far reversibly holding the plurality of the null units is located within the demarcated playing zone;
the measuring means comprises an axis;
the axis is located within the demarcated playing zone and marked in substantially equal units from N to M;
M is a positive whole integer;
N is a negative whole integer;
substantially each of the positive units is adapted to reversibly attach to a unit from 0 to M on the axis on the playing surface; and
substantially each of the negative units is adapted to reversibly attach to a unit from 0 to N on the axis on the playing surface.

22. A game apparatus far assisting in teaching the addition and subtraction of positive and negative numbers, the game apparatus comprising:
 (a) a plurality of positive units, with each positive unit bearing an indicia denoting a positive unit;
 (b) a plurality of negative units, with each negative unit bearing an indicia denoting a negative unit;
 (c) a playing surface comprising a demarcated playing zone; and
 (d) a means for measuring the number of units selected from the group consisting of positive units, negative units, and combinations thereof,
where
 the positive units and the negative units are adapted to reversibly be interconnected with one another to form null units;
 each formed null unit comprises a single positive unit and a single negative unit;
 each of the positive units is substantially identical in appearance;
 each of the negative units is substantially identical in appearance;
 each positive unit is adapted so that, at any given time, it is capable of being reversibly interconnected with only a single negative unit; and
 each negative unit is adapted so that, at any given time, it is capable of being reversibly interconnected with only a single positive unit.

23. A game apparatus for assisting in teaching the addition and subtraction of positive and negative numbers, the game apparatus comprising:
 (a) a plurality of positive units, with each positive unit bearing an indicia denoting a positive unit;
 (b) a plurality of negative units, with each negative unit bearing an indicia denoting a negative unit; and
 (c) a playing surface comprising a demarcated playing zone,
where
 the positive units and the negative units are adapted to reversibly be associated with one another to form null units, with each null unit comprising at least one positive unit and at least one negative unit;
 at least one positive unit is located on the playing surface within the demarcated playing zone, with the number of positive units located on the playing surface within the demarcated playing zone being a positive integer P;
 at least one negative unit is located on the playing surface within the demarcated playing zone, with the number of negative units located on the playing surface within the demarcated playing zone being a positive integer N; and
 the demarcated playing zone has a numerical value equal to P−N.

24. The game apparatus of claim 23 where P is greater than N and the numerical value of the demarcated playing zone is a positive integer.

25. The game apparatus of claim 23 where P is less than N and the numerical value of the demarcated playing zone is a negative integer.

26. The game apparatus of claim 23 where P equals N and the numerical value of the demarcated playing zone is zero.

27. The game apparatus of claim 23 where at least one of the positive units that are located on the playing surface within the demarcated playing zone is reversibly associated with at least one of the negative units that are located on the playing surface within the demarcated playing zone so that at least one null unit is located on the playing surface within the demarcated playing zone.

28. The game apparatus of claim 23 where the area of the playing surface and the area of the demarcated playing zone are substantially equal.

29. The game apparatus of claim 23 where the playing surface comprises a screen of an electrical unit.

30. The game apparatus of claim 23 where the indicia denoting a positive unit is a positive sign and the indicia denoting a negative unit is a negative sign.

* * * * *